(12) United States Patent
Dunn

(10) Patent No.: US 12,491,074 B2
(45) Date of Patent: Dec. 9, 2025

(54) COMPOSITE IMPLANT FOR TOTAL MENISCUS RECONSTRUCTION

(71) Applicant: Rutgers, The State University of New Jersey, New Brunswick, NJ (US)

(72) Inventor: Michael G. Dunn, Manalapan, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 888 days.

(21) Appl. No.: 17/755,749

(22) PCT Filed: Nov. 6, 2020

(86) PCT No.: PCT/US2020/059424
§ 371 (c)(1),
(2) Date: May 6, 2022

(87) PCT Pub. No.: WO2021/092391
PCT Pub. Date: May 14, 2021

(65) Prior Publication Data
US 2022/0401220 A1    Dec. 22, 2022

Related U.S. Application Data

(60) Provisional application No. 62/931,500, filed on Nov. 6, 2019.

(51) Int. Cl.
*A61F 2/38* (2006.01)
*A61F 2/30* (2006.01)

(52) U.S. Cl.
CPC ...... *A61F 2/30756* (2013.01); *A61F 2/30749* (2013.01); *A61F 2/30965* (2013.01);
(Continued)

(58) Field of Classification Search
CPC ............... A61F 2/3872; A61F 2/30756; A61F 2002/30754; A61F 2002/30766; A61F 2002/30131; A61F 2230/0013; A61F 2/30965; A61F 2002/5055; A61F 2002/4495
See application file for complete search history.

(56) References Cited

U.S. PATENT DOCUMENTS 6,103,255 A    8/2000 Levene et al.
7,157,428 B2   1/2007 Kusanagi et al.
(Continued)

FOREIGN PATENT DOCUMENTS

EP    1493404 A1    1/2005

*Primary Examiner* — Javier G Blanco
(74) *Attorney, Agent, or Firm* — FOX ROTHSCHILD LLP

(57) ABSTRACT

Artificial meniscal scaffolds characterized by a composite of circumferential polymer fiber network and orthogonal polymer fiber network embedded in an arcuate bioresorbable matrix comprised of collagen and hyaluronic acid. The orthogonal polymer fiber network prevents separation of the circumferential polymer fiber networks. The polymer fiber networks convert axial compressive forces on the scaffolds to tensile loads on the circumferential polymer fibers. The composite scaffold can be anchored to bone by novel anchoring components that protect the polymer fibers and ensure immediate securement of the artificial meniscal scaffold to bone.

5 Claims, 9 Drawing Sheets

(52) U.S. Cl.
CPC ............... *A61F 2002/30056* (2013.01); *A61F 2002/30062* (2013.01); *A61F 2002/3008* (2013.01); *A61F 2002/30131* (2013.01); *A61F 2002/30677* (2013.01); *A61F 2002/30766* (2013.01); *A61F 2/3872* (2013.01); *A61F 2310/00011* (2013.01); *A61F 2310/00359* (2013.01)

(56) References Cited

U.S. PATENT DOCUMENTS

| | | |
|---|---|---|
| 9,078,756 B2 | 7/2015 | Gatt et al. |
| 2003/0078617 A1* | 4/2003 | Schwartz ............ A61L 27/3852 606/232 |
| 2003/0125744 A1 | 7/2003 | Contiliano et al. |
| 2008/0255665 A1* | 10/2008 | Weissberg ................. A61F 2/08 623/908 |
| 2010/0168864 A1* | 7/2010 | White .................. A61B 17/562 623/18.11 |
| 2012/0232656 A1* | 9/2012 | Gedet .................... A61F 2/3872 623/14.12 |
| 2014/0222149 A1* | 8/2014 | Amis .................. A61F 2/30756 623/14.12 |
| 2014/0243911 A1 | 8/2014 | Almarza et al. |
| 2016/0193033 A1 | 7/2016 | Murray et al. |
| 2016/0235545 A1* | 8/2016 | Linder-Ganz ....... A61F 2/30756 |
| 2017/0007411 A1 | 1/2017 | Khan et al. |

* cited by examiner

COMPOSITE IMPLANT FOR TOTAL MENISCUS RECONSTRUCTION

CROSS-REFERENCE TO RELATED APPLICATIONS

This application is a U.S. national phase of International Patent Application No. PCT/US20/59424 filed Nov. 6, 2020, which claims the benefit under 35 U.S.C. § 119 (e) of U.S. Provisional Application Ser. No. 62/931,500 filed Nov. 6, 2019, the disclosures of which are incorporated herein by reference in their entirety.

STATEMENT REGARDING FEDERALLY SPONSORED RESEARCH

This invention was made with Government support under Grant Number W81XWH-14-2-0003 awarded by the U.S. Department of Defense. The Government has certain rights in this invention.

FIELD OF THE INVENTION

This invention relates to methods and devices for replacement of severely damaged fibrocartilage tissue and, in particular, to the replacement of the lateral or medial meniscus of the knee.

BACKGROUND OF THE INVENTION

The menisci are two C-shaped discs of fibrocartilage found between the condyles of the femur and the tibial plateau which play a critical role in the load transmission, load distribution, shock absorption, joint stability, and lubrication of the knee. Despite the recognized importance of the tissue, arthroscopic removal of a torn meniscus is one of the most common orthopedic procedures performed in the United States, with almost one million meniscal surgeries performed annually. The public health burden and long-term effects of meniscal injuries are substantial, particularly in physically active populations, because of the increased risk for early-onset osteoarthritis and long-term disability and the health care costs associated with degenerative joint disease. Because the meniscus has limited healing potential, the clinical outcomes of subtotal meniscectomies are generally poor. At this time, a reliable surgical procedure to replace significant loss of meniscal tissue does not exist. There is no autologous procedure to replace the meniscus and the results of allograft replacement are unreliable.

Another approach is that of tissue engineering. Current approaches include synthetic polymer scaffolds and collagen meniscus implants. With synthetic polymer scaffolds, polyurethane sponges are used to replace the meniscus. This approach has led to inconsistent results. Fibrocartilage growth is seen in some studies using this technology while in others fibrous tissue did not remodel into fibrocartilage. The underlying cartilage was protected in some studies but not protected in others. Another type of meniscus implant uses a sponge containing collagen, hyaluronic acid and chondroitin sulfate. There is promising preliminary data for this implant, but it is not widely accepted by the orthopedic community because of issues with cytotoxic byproducts of cross-linking and scaffold shrinkage. Both of these approaches generate an amorphous structure, the mechanical properties of which may not be appropriate for a device designed to replace the meniscus. Thus, while scaffold technology holds promise, no methods have met with the clinical success necessary for acceptance by the orthopedic community.

U.S. Pat. No. 9,078,756 describes a tissue engineered scaffold with the necessary mechanical properties and biocompatibility for treatment of significant meniscal damage and is incorporated by reference herein. Any information in this patent is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein. U.S. Pat. No. 9,078,756 discloses a composite meniscal scaffold comprised of a collagen-hyaluronic acid matrix reinforced with a fibers extending in a circumferential direction along the scaffold, the fibers of which are in turn held together by other fibers embedded orthogonally to the circumferential fibers. U.S. Pat. No. 9,078,756 also describes how the anterior and posterior attachment segments of the meniscal scaffold may be inserted into these bone tunnels to generate hoop stresses in the scaffold. The resulting configuration behaves like natural fibrocartilage that translates an axial compressive load into a circumferential tensile load. The ability of the meniscal scaffold to translate axial loads to circumferential hoop stress is dependent on the entire length of fiber remaining intact during the initial period of healing. However, securement of the attachment segments into bone tunnels by using existing metal or polymeric interference screws may result in damage to the fibers. Thus, there is a need to protect the fibers of the attachment segments from nicks or cuts that may occur while they are surgically fixed to the tibial plateau. An ideal artificial meniscal scaffold should be able to be fixed to the tibial plateau and protect the polymeric fibers from being cut or nicked during implantation.

SUMMARY OF THE INVENTION

The present invention incorporates the discovery that the attachment segments of prior art scaffolds can be improved with novel anchoring devices provided by the present invention. For prior art scaffolds that are reinforced with a fiber scaffold extending in a circumferential direction that is in turn held together by other fibers embedded orthogonally to the circumferential fibers, novel anchoring devices are provided that can be incorporated onto such scaffold devices to protect the fiber networks from damage during implantation. The resulting configuration behaves like natural fibrocartilage that translates an axial compressive load into a circumferential tensile load.

The invention is an artificial meniscal scaffold comprising an arcuate bioresorbable matrix that has circumferential bioresorbable fibers embedded therein. A network of orthogonal bioresorbable fibers is also embedded in the arcuate bioresorbable matrix to prevent separation of the circumferential fibers. The bioresorbable circumferential and orthogonal fibers define a three-dimensional shape and geometry which is substantially the same as natural meniscal tissue. The artificial meniscal scaffold is comprised of an anterior end, a posterior end, and a middle section therebetween defining a curved path between the anterior and posterior ends. In addition, the network of circumferential bioresorbable fibers extends between the anterior and posterior ends along the curved path and exits the anterior and posterior ends of the scaffold to form respective anterior and posterior attachment segments. The anterior and posterior attachment segments have a proximal region, a distal region, a length, and an exterior surface.

In one embodiment, the exterior surface of at least one of the anterior and posterior attachment segments is coated with a polymer. In another embodiment, a polymeric fiber is wound around at least a portion of the exterior surface of at least one of the anterior and posterior attachment segments. In yet another embodiment, a polymeric fiber is wound around at least a portion of the anterior end, posterior end, or middle section of the artificial meniscal scaffold. In still yet another embodiment, an aperture is present between the proximal region and distal region of at least one of the anterior and posterior attachment segments. In one embodiment, an anchoring component is attached to the distal region of at least one of the anterior and posterior attachment segments.

DETAILED DESCRIPTION

Figure 1:
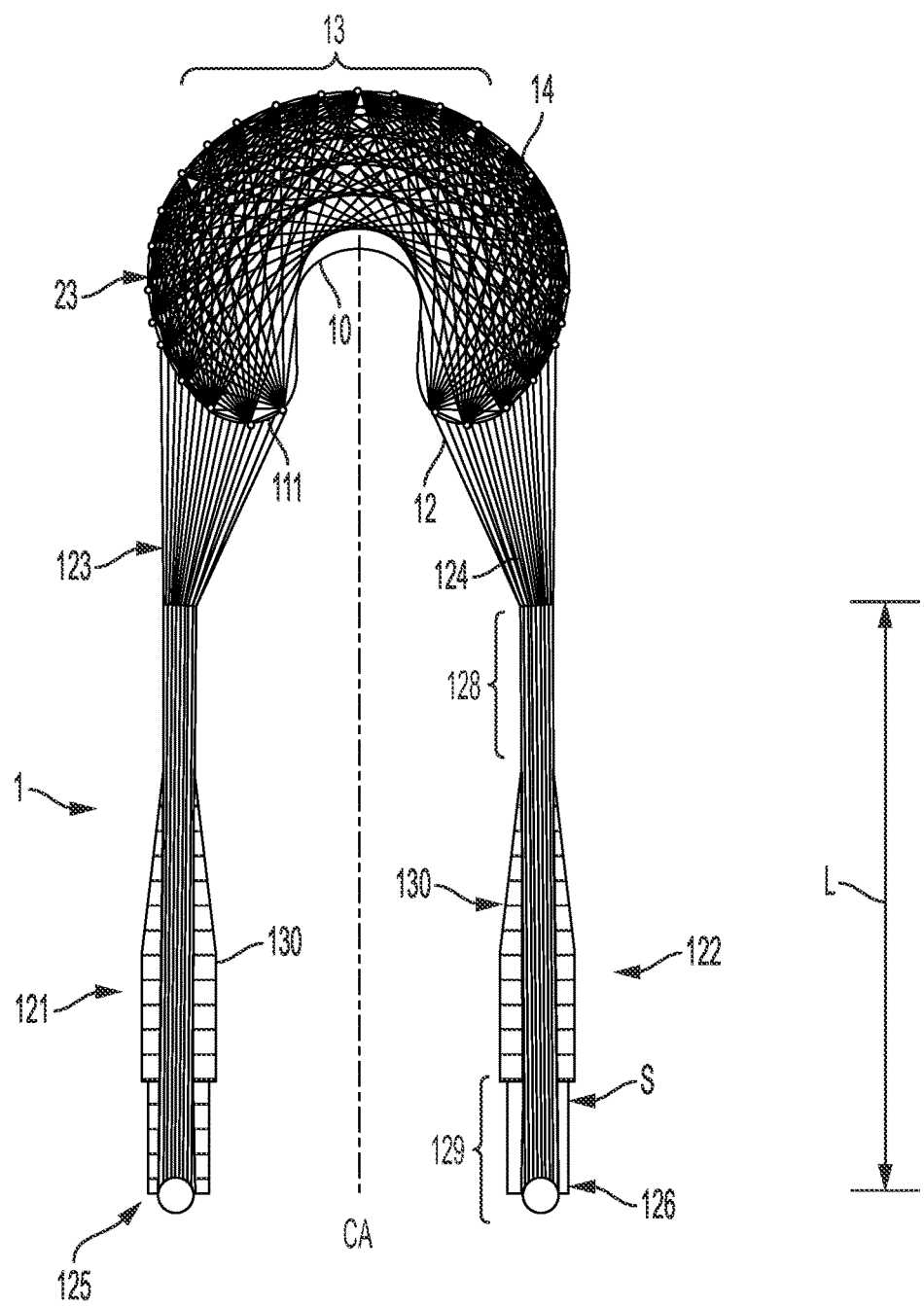
FIG. 1. is a top view of an artificial meniscal scaffold with a polymer coating on the attachment segments.

One aspect of the artificial meniscal scaffold 1 comprising a reinforcing network of circumferential polymeric fibers 23 and orthogonal polymeric fibers 14 embedded in an arcuate bioresorbable matrix 10 is shown in FIG. 1. The term "circumferential polymeric fibers" refers to fibers that extend between the anterior end and posterior end of the scaffold along the middle section of the scaffold and are positioned at least in part substantially parallel to the circumferential axis. The term "orthogonal polymeric fibers" refers to fibers that cross the circumferential polymeric fibers at various angles to keep them from separating. Keeping the circumferential polymeric fibers from separating increases the durability and longevity of the implant. For convenience, terms "circumferential fiber network" and "orthogonal fiber network" may be used herein to refer to multiple circumferential fibers or multiple orthogonal fibers, respectively. The scaffold 1 includes an anterior end 11, a posterior end 12 and a middle section 13 between the anterior end 11 and the posterior end 12. The middle section 13 is essentially arc-shaped and defines a curved path between the anterior end 11 and posterior end 12. The shape and geometry of the scaffold is based on the shape and geometry of a natural human meniscus, and thus the scaffold 1 generally forms a c-shaped disc with a wedge-like cross-section. The reinforcing network of circumferential fibers 23 extend between the anterior end 11 and posterior end 12 of the scaffold 1 and extend further to form an anterior attachment segment 121 and a posterior attachment segment 122. The attachment segments 121, 122 extend generally parallel to a central axis CA of the scaffold 1. The attachment segment 121 is formed by fibers 23 extending from the anterior end 11 through a tapering horn section 123 to an extended end 125. Similarly, the attachment segment 122 is formed by fibers 23 extending from the posterior end 12 through a tapering horn section 124 to an extended end 126. The horns 123, 124 accommodate placement of the attachment segments 121, 122 through bone tunnels and also prevent joint impingent on the scaffold 1. The elongated attachment segments 121, 122 have proximal region 128, a distal region 129, a length L, and an exterior surface S.

The attachment segments 121 and 122 are configured to traverse the entire length of a bone tunnel (not shown). This allows for a fixation method wherein the attachment segments 121 and 122 extend through the bone tunnel and then are fixed to the tibia using interference screws (not shown) or the like. This provides a more rigid attachment. However, use of interference screws may potentially damage the extension fibers 23 that extend through the tapering horn section 123 and into the attachment segments 121 and 122. The invention described and shown herein reduces or eliminates the chance that damage to these fibers occurs.

Figure 2:
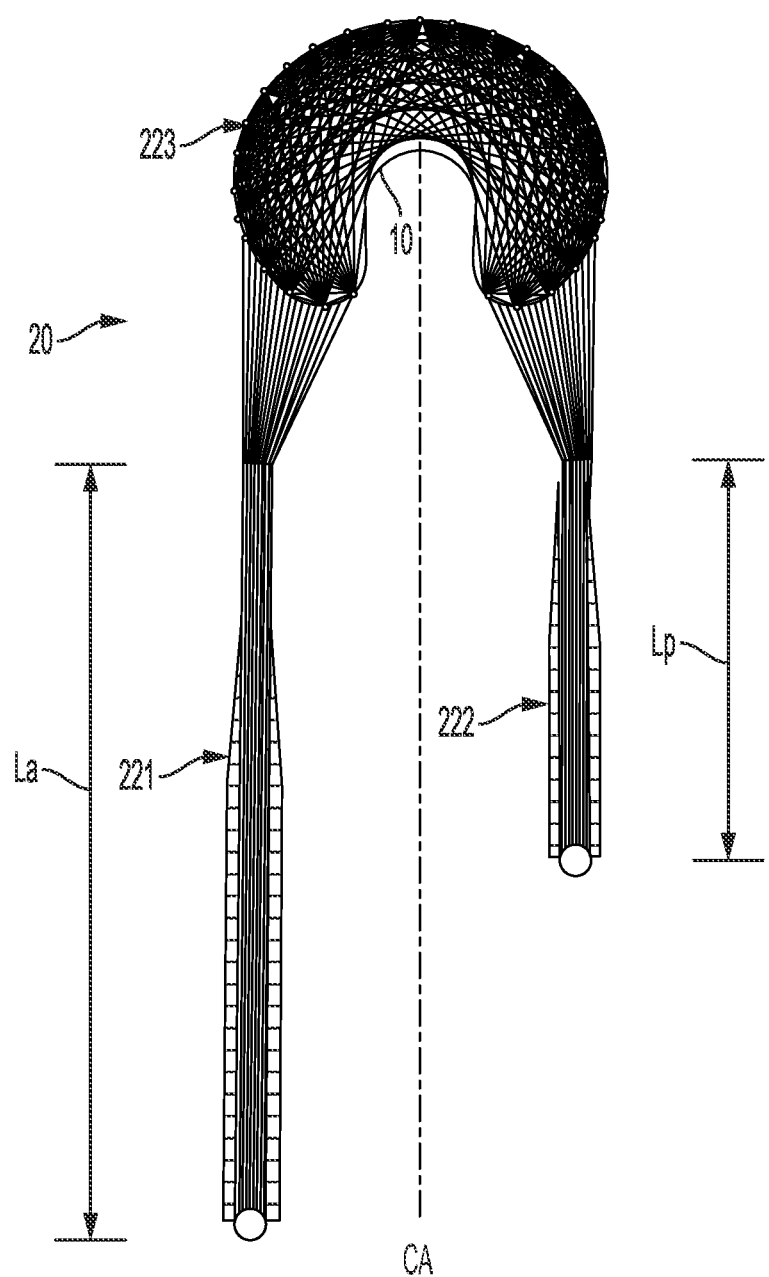
FIG. 2. is a top view of an artificial meniscal scaffold with a polymer coating on the attachment segments of different lengths.

In one embodiment, the exterior surface S of at least one of the anterior attachment segments 121 or posterior attachment segment 122 has a coating 130 to protect the fibers 23. In one embodiment, the coating 130 is a polymer that is applied by a spraying process. In one embodiment, the coating is applied by dipping the attachment segments 121 and 122 in a solution containing the polymer, removing it from the solution, and allowing it to dry under controlled conditions of humidity and temperature. In one embodiment the coating 130 is a resorbable polymer selected from the group consisting of poly(lactic acid) and polyglycolic acid, poly(4-hydroxybutyrate), polydioxanes, polyoxalates, polylactones, polyester hydrogels, and co-polymers of polyglycolide and polylactide. In one embodiment, the thickness of the coating 130 is greater than 0.10 mm and less than 5.0 mm. In one embodiment, the polymeric coating 130 is coated with collagen. In one embodiment of the artificial meniscal scaffold 20 shown in FIG. 2, the length $L_a$ of the anterior attachment segment 221 is greater than the length $L_p$ of the posterior attachment segment 222. In another embodiment (not shown), the length $L_a$ of the anterior attachment segment 221 is less than the length $L_p$ of the posterior attachment segment 222.

Figure 3:
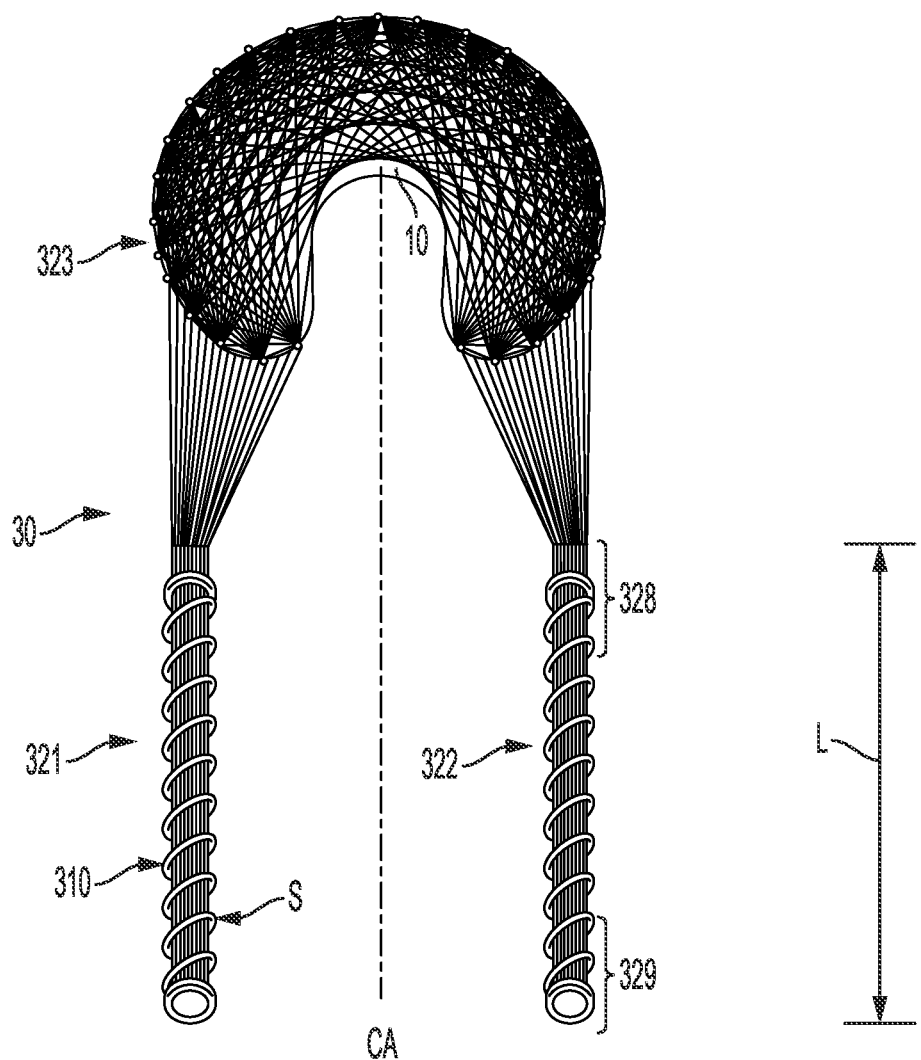
FIG. 3. is a top view of an artificial meniscal scaffold with a polymer fiber winding over the attachment segments.
Figure 7:
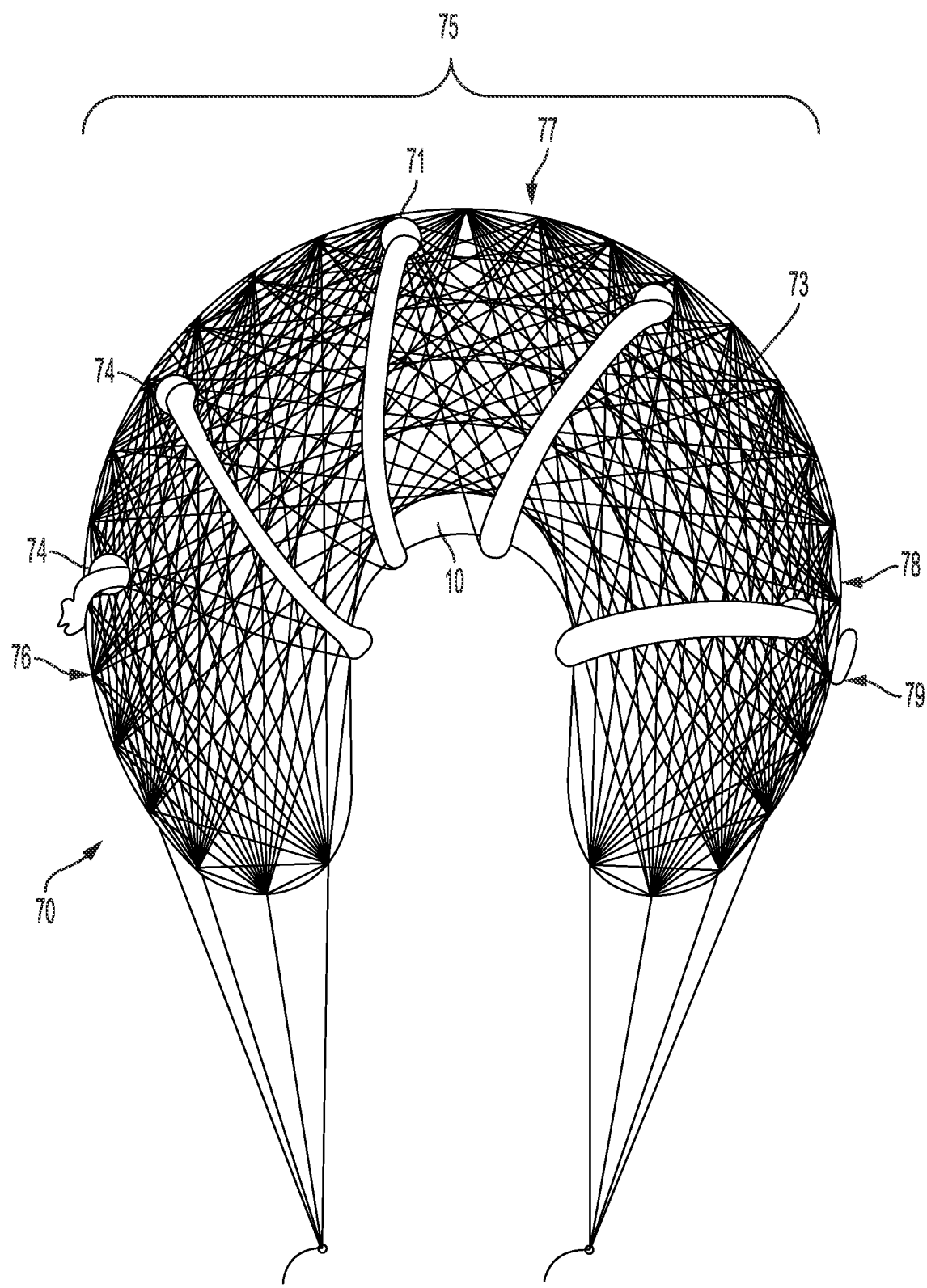
FIG. 7. is a top view of an artificial meniscal scaffold with a polymer fiber winding over the arcuate portion of the scaffold.

In one embodiment of the artificial meniscal scaffold 30 shown in FIG. 3, the elongated attachment segments 321, 322 have a proximal region 328, distal region 329, length L, an exterior surface S, and a polymeric fiber 310 wound around at least a portion of the exterior surface S of the anterior attachment segment 321 and posterior attachment 322 segment. In one embodiment, the polymeric fiber 310 is attached to the exterior surface S by an adhesive (not shown). In another embodiment, a collagen coating (not shown) is placed over the polymeric fiber 310. In another embodiment, the polymeric fiber 310 is fixed to the exterior surface S by using the polymeric fiber 310 to tie a knot around the proximal region 328 and distal region 329 of the attachment segments 321 and 322. In yet another embodiment, the polymeric fiber 310 is wound between and around the fibers 323 that comprise the attachment segments 321 and 322. In one embodiment, the diameter of the polymeric fiber 310 is between 0.05 mm and 1 mm. In one embodiment, the polymeric fiber 310 is comprised of a resorbable polymer selected from the group consisting of poly(lactic acid) and polyglycolic acid, poly(4-hydroxybutyrate), polydioxanes, polyoxalates, polylactones, polyester hydrogels, and co-polymers of polyglycolide and polylactide. In one embodiment of the artificial meniscal scaffold 70 shown in FIG. 7, the polymeric fiber 71 is used to protect fibers 73 that form the arcuate portion 75 of the scaffold 70. The polymeric fiber 71 is laced through holes 74 in the arcuate portion 75 and can be secured by knots 79 formed in the anterior end 76, posterior end 78, and middle section 77.

Figure 4:
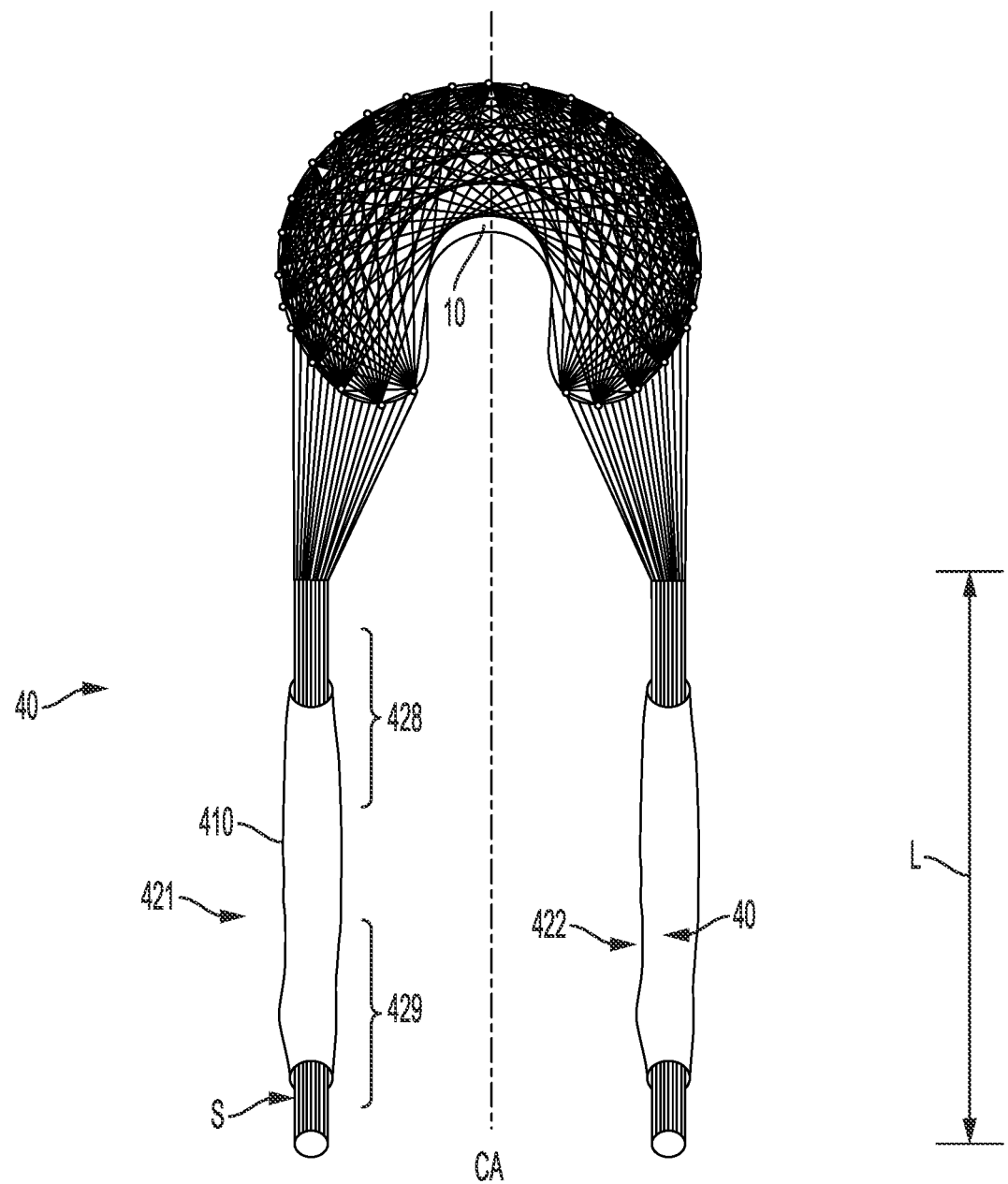
FIG. 4. is a top view of an artificial meniscal scaffold with a polymeric sleeve over the attachment segments.

In one embodiment of the artificial meniscal scaffold 40 shown in FIG. 4, the elongated attachment segments 421, 422 have a proximal region 428, distal region 429, length L, an exterior surface S, and a cylindrical polymeric sleeve 410 covering the exterior surface S of at least one of the anterior attachment segment 421 and posterior attachment 422 segment. In one embodiment, the cylindrical polymeric sleeve 410 is attached to the exterior surface S by an adhesive (not shown). The polymeric sleeve is preferably comprised of a resorbable polymer selected from the group consisting of poly(lactic acid) and polyglycolic acid, poly(4-hydroxybutyrate), polydioxanes, polyoxalates, polylactones, polyester hydrogels, and co-polymers of polyglycolide and polylactide. In one embodiment, the thickness of the polymeric sleeve 410 is between 0.1 mm and 2.0 mm. In another embodiment, the polymeric sleeve 410 is porous, with the average pore diameter between 0.1 mm and 1 mm.

Figure 5:
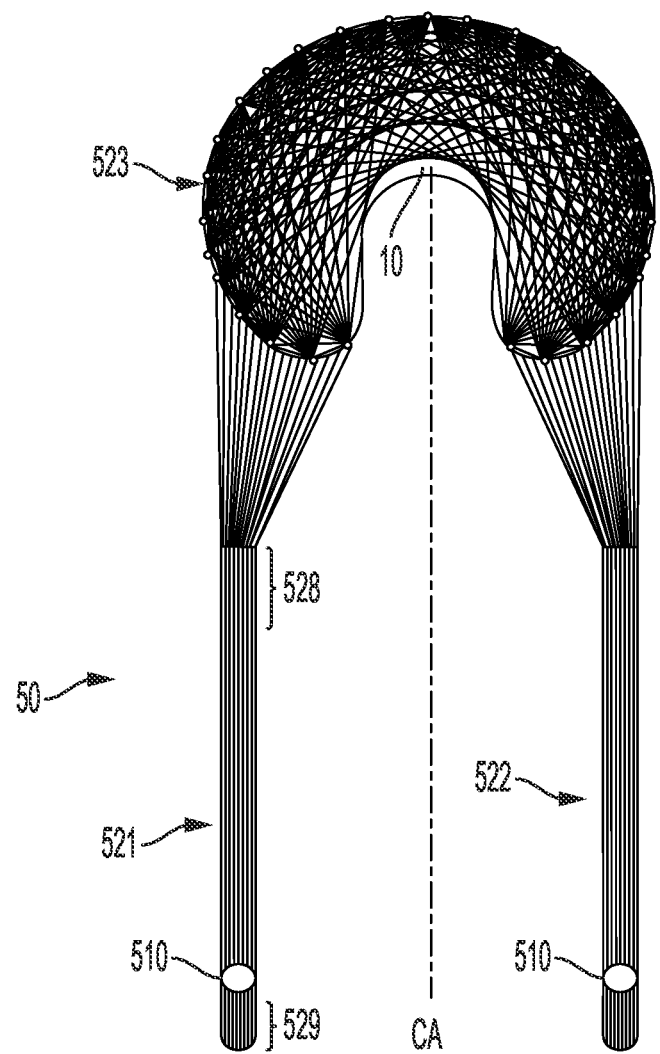
FIG. 5. is a top view of an artificial meniscal scaffold with an aperture on the attachment segments.

In one embodiment of the artificial meniscal scaffold 50 shown in FIG. 5, the elongated attachment segments 521, 522 have a proximal region 528, distal region 529, length L, an exterior surface S, and an aperture 510 present between the proximal region 528 and distal region 529 of the elongated attachment segments 521 and 522. The aperture 510 can be used to pass sutures through, to further assist the surgeon in placing the elongated attachment segments into the tibia. In one embodiment, the aperture 510 is a circular or ellipsoidal shaped ring with a diameter between 1 mm and 5 mm that is comprised of a resorbable polymer selected from the group consisting of poly(lactic acid) and polyglycolic acid, poly(4-hydroxybutyrate), polydioxanes, polyoxalates, polylactones, polyester hydrogels, and co-polymers of polyglycolide and polylactide. In one embodiment, the aperture 510 is bound to the fibers 523 that extend into the attachment segments 521 and 522 by an adhesive (not shown). In another embodiment, the aperture 510 is sewn into the fibers 523 by use of resorbable sutures (not shown) commonly used in surgery such as Vicryl™, PDS™, or Monocryl™.

Figure 6A:
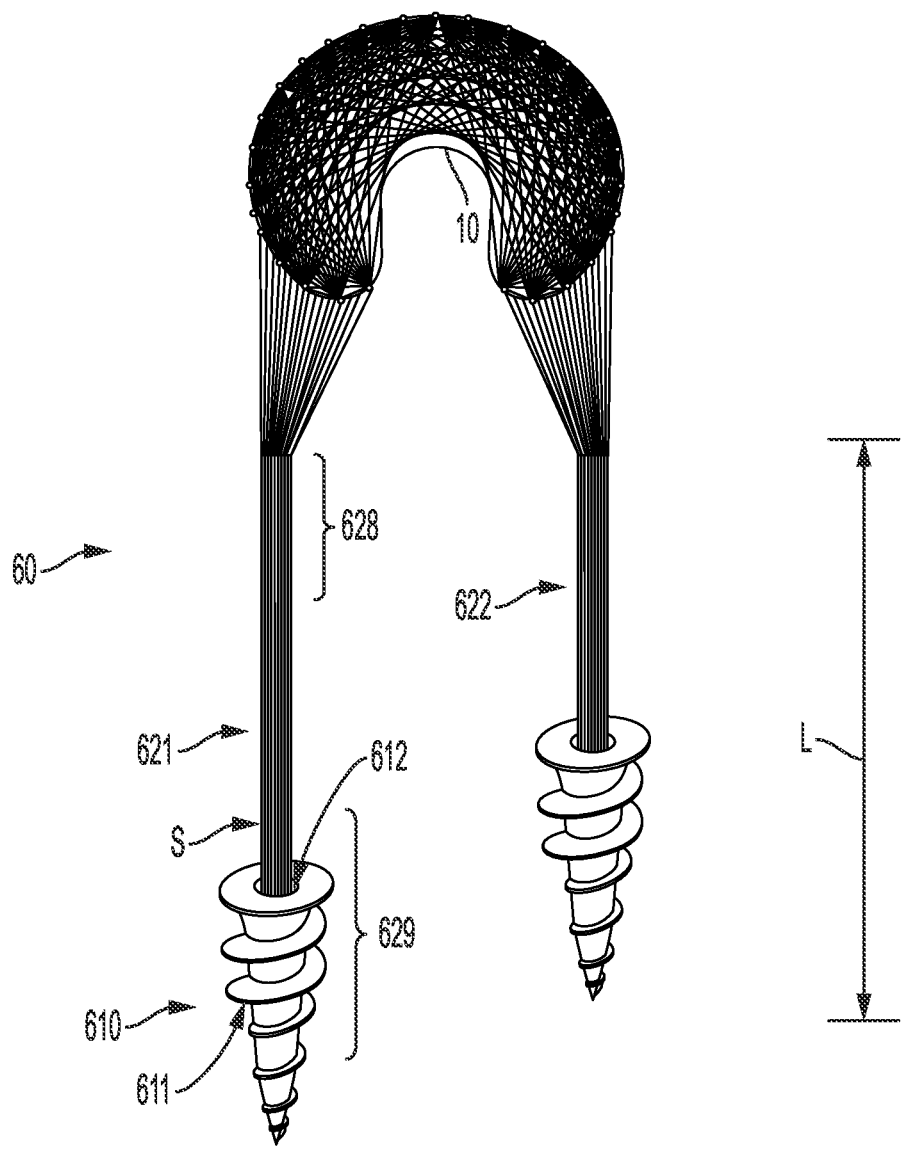
FIG. 6A. is a top view of an artificial meniscal scaffold with attachment segments that have been coupled to an anchoring component with a threaded surface.

In one embodiment of the artificial meniscal scaffold 60 shown in FIG. 6A, the elongated attachment segments 621, 622 have a proximal region 628, distal region 629, length L, an exterior surface S, and an anchoring component 610 attached to the distal region of the anterior and posterior attachment segments 621 and 622. The anchoring component 610 has an opening 612 for attachment segment 621 to pass through. The anchoring component 610 also has a lumen (not shown) to allow for coupling an attachment segment to the anchoring component. This fixation can be accomplished with an adhesive such as cyanoacrylate or fibrin glue. A threaded surface 611 enables the anchoring component 610 to be screwed into a bone tunnel. In one embodiment shown in FIG. 6B, the anchoring component 620 has an opening 630 to receive a portion of attachment segment 621. A ribbed surface 631 enables the anchoring component 620 to be pushed into a bone tunnel. The ribbed surface 631 will prevent pull-out of the attachment segment 621. The anchoring component 620 may also have a slit 632 that allows the attachment segment 621 to be slidably engaged within the anchoring component 620. In one embodiment shown in FIG. 6C, the anchoring component 640 has an opening 641 to receive a portion of attachment segment 621. A ribbed surface 641 enables the anchoring component 640 to be pushed into a bone tunnel. The ribbed surface 641 will prevent pull-out of the attachment segment 621 from a bone tunnel. In addition to a slit 642 that allows the attachment segment 621 to be slidably engaged within the anchoring component 640, the anchoring component 640 also has at least one flange 644 to prevent further fix the anchoring component within a bone tunnel. In one embodiment, at least one flange exists within the lumen (not shown) of the anchoring component 640 that would prevent the attachment segment 621 from sliding out of the anchoring component 640.

Figure 6B:
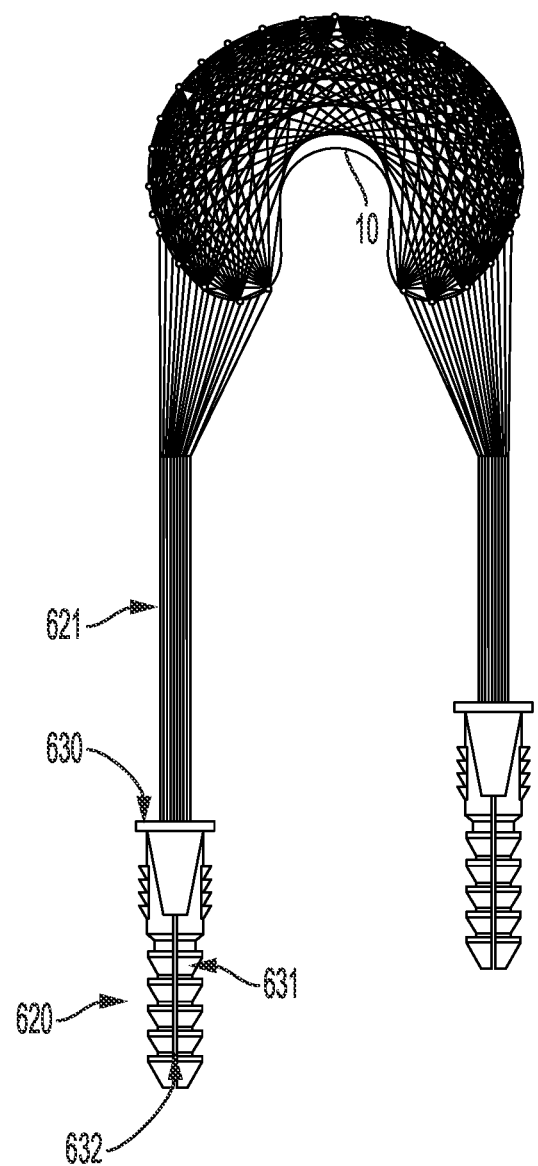
FIG. 6B. is a top view of an artificial meniscal scaffold with attachment segments that have been coupled to an anchoring component with a ribbed surface.
Figure 6C:
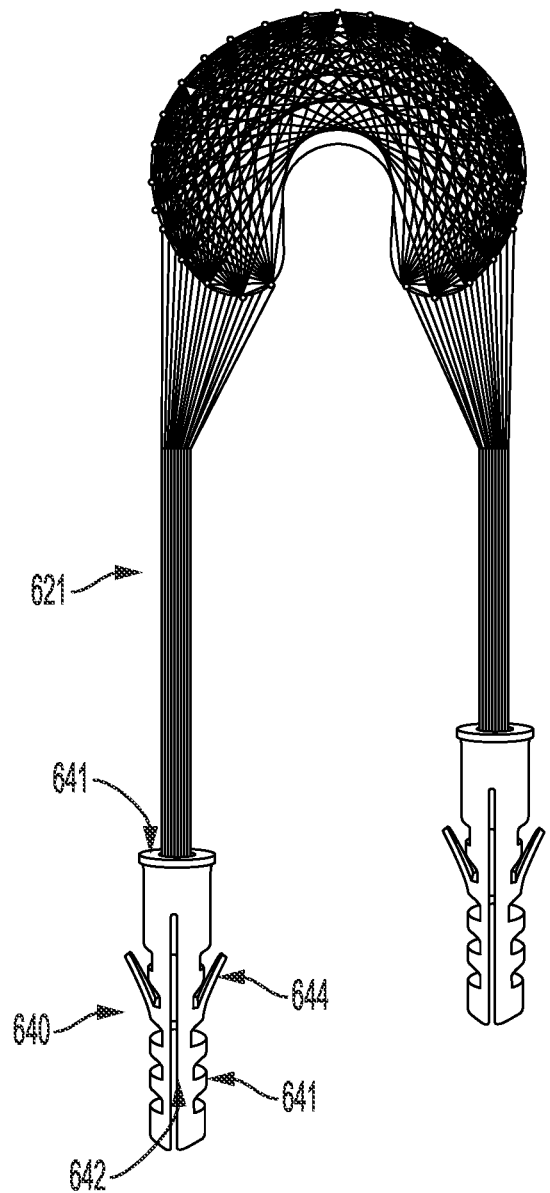
FIG. 6C. is a top view of an artificial meniscal scaffold with attachment segments that have been coupled to an anchoring component with a flanged surface.

In one embodiment of the artificial meniscal scaffold, the anchoring component on one attachment segment is different than the anchoring component on the other attachment segment. For example, the anterior attachment segment may be coupled to a threaded anchoring component like that shown in FIG. 6A, while the posterior attachment segment is coupled to an anchoring component like that shown in FIG. 6B that is pushed into a bone tunnel. In some embodiments, the anchoring components shown in FIGS. 6A, 6B, and 6C are comprised of a resorbable polymer selected from the group consisting of poly(lactic acid) and polyglycolic acid, poly(4-hydroxybutyrate), polydioxanes, polyoxalates, polylactones, polyester hydrogels, and co-polymers of polyglycolide and polylactide. In one embodiment, the anchoring components shown in FIGS. 6A, 6B, and 6C are comprised of a metal selected from the group consisting of stainless steel, nitinol, tantalum, or titanium.

Referring back to FIGS. 1-7, the arcuate bioresorbable matrix 10 of the artificial meniscal scaffold is comprised of collagen and hyaluronic acid. In one embodiment, the matrix 10 fills all of the inter-fiber spaces and coats the entire scaffold, including the attachment segments. In one embodiment, the matrix 10 fills only the inter-fiber spaces of the arcuate portion of the artificial meniscal scaffold. In one embodiment, the collagen is type I collagen purified from bovine tendon. In one embodiment, an acidic dispersion of collagen and hyaluronic acid matrix is forced into the inter-fiber spaces of the scaffold described supra and lyophilized. In one embodiment, the collagen within the matrix is crosslinked with physical treatments such as dehydrothermal crosslinking or ultraviolet light. Alternatively, chemical crosslinking of the collagen can be achieved by use of aldehydes or carbodiimides. In one embodiment, the carbodiimide is 1-ethyl-3-(3-dimethylaminopropyl) carbodiimide, also known as EDC.

Post-operative imaging and assessment of the artificial meniscal scaffold is critical to both surgeons and patients. In one embodiment of the artificial meniscal scaffold, the arcuate bioresorbable matrix contains a radiopaque material such as iodine, barium, tantalum, bismuth, or gold. In one embodiment of the artificial meniscal scaffold, the arcuate bioresorbable matrix contains platelet rich plasma or mammalian cells. In one embodiment of the artificial meniscal scaffold, the arcuate bioresorbable matrix contains an antimicrobial agent, antibiotic, or anti-fungal agent. In one embodiment of the artificial meniscal scaffold, the arcuate bioresorbable matrix contains bone derivatives or calcium-phosphate compounds. In one embodiment, the matrix is comprised of bone derivatives from an allograft, autograft or xenograft source. In one embodiment, the calcium phosphate compound is hydroxyapatite or tricalcium phosphate. In one embodiment, the tricalcium-phosphate compound is beta-tricalcium-phosphate.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention which is defined by the following claims.

The invention claimed is:

1. An artificial meniscal scaffold for placement in a knee joint, the artificial meniscal scaffold comprising:
   an arcuate bioresorbable matrix;
   a network of circumferential bioresorbable fibers embedded in said matrix; and
   a network of orthogonal bioresorbable fibers embedded in said matrix to prevent separation of said circumferential fiber network;
   wherein the bioresorbable circumferential fibers and the bioresorbable orthogonal fibers have a three-dimensional shape and geometry which is substantially the same as the three-dimensional shape and geometry of the matrix;
   wherein the scaffold is comprised of an anterior end, a posterior end, and a middle section therebetween defining a curved path between said anterior and posterior ends;
   wherein the network of circumferential bioresorbable fibers extends between said anterior and posterior ends along the path of said curve and exits the anterior and posterior ends of the scaffold to form respective anterior and posterior attachment segments;
   wherein the anterior and posterior attachment segments have a proximal region, a distal region, a length, and an exterior surface;
   wherein a polymeric fiber is wound multiple times around at least a portion of an exterior surface of the middle section to protect the circumferential and orthogonal bioresorbable fibers embedded in the arcuate bioresorbable matrix;
   wherein the polymeric fiber is laced through holes in the arcuate bioresorbable matrix and secured by knots to the exterior surface of the middle section of the arcuate bioresorbable matrix; and,
   wherein the artificial meniscal scaffold is a C-shaped disc with a wedge-like cross-section.

2. The artificial meniscal scaffold of claim 1, wherein the matrix is comprised of a radiopaque material containing iodine, barium, tantalum, bismuth, or gold.

3. The artificial meniscal scaffold of claim 1, wherein the matrix is comprised of platelet rich plasma or mammalian cells.

4. The artificial meniscal scaffold of claim 1, wherein the matrix is comprised of an antimicrobial agent, antibiotic, or anti-fungal agent.

5. The artificial meniscal scaffold of claim 1, wherein the matrix is comprised of bone derivatives or calcium-phosphate compounds.

* * * * *